United States Patent
Ismael et al.

(10) Patent No.: US 9,292,686 B2
(45) Date of Patent: Mar. 22, 2016

(54) MICRO-VIRTUALIZATION ARCHITECTURE FOR THREAT-AWARE MICROVISOR DEPLOYMENT IN A NODE OF A NETWORK ENVIRONMENT

(71) Applicant: FireEye, Inc., Milpitas, CA (US)

(72) Inventors: Osman Abdoul Ismael, Palo Alto, CA (US); Ashar Aziz, Coral Gables, FL (US)

(73) Assignee: FireEye, Inc., Milpitas, CA (US)

( * ) Notice: Subject to any disclaimer, the term of this patent is extended or adjusted under 35 U.S.C. 154(b) by 0 days.

(21) Appl. No.: 14/229,626

(22) Filed: Mar. 28, 2014

(65) Prior Publication Data

US 2015/0199532 A1 Jul. 16, 2015

Related U.S. Application Data

(60) Provisional application No. 61/928,323, filed on Jan. 16, 2014.

(51) Int. Cl.
| | |
|---|---|
| G06F 9/455 | (2006.01) |
| G06F 21/55 | (2013.01) |
| G06F 21/62 | (2013.01) |

(52) U.S. Cl.
CPC .......... *G06F 21/552* (2013.01); *G06F 9/45533* (2013.01); *G06F 9/45558* (2013.01); *G06F 21/629* (2013.01); *G06F 2009/45587* (2013.01)

(58) Field of Classification Search
CPC .......... G06F 2009/45587; G06F 21/53; G06F 9/45545
See application file for complete search history.

(56) References Cited

U.S. PATENT DOCUMENTS

| | | |
|---|---|---|
| 8,201,246 B1 | 6/2012 | Wu et al. |
| 8,271,978 B2 | 9/2012 | Bennett et al. |

(Continued)

FOREIGN PATENT DOCUMENTS

| | | |
|---|---|---|
| WO | WO2012/135192 | 10/2012 |
| WO | WO2012/154664 | 11/2012 |

(Continued)

OTHER PUBLICATIONS

Randy Bias, "Micro Virtual Machines", Jul. 12, 2007, retrieved online <http://web.archive.org/web/20100920064755/http://cloudscaling.com/blog/cloud-computing/technology/micro-virtual-machines>, retrieved on Nov. 12, 2015.*

(Continued)

*Primary Examiner* — Jason K. Gee
*Assistant Examiner* — Zhimei Zhu
(74) *Attorney, Agent, or Firm* — Cesari and McKenna, LLP

(57) ABSTRACT

A micro-virtualization architecture deploys a threat-aware microvisor as a module of a virtualization system configured to facilitate real-time security analysis, including exploit detection and threat intelligence, of operating system processes executing in a memory of a node in a network environment. The micro-virtualization architecture organizes the memory as a user space and kernel space, wherein the microvisor executes in the kernel space of the architecture, while the operating system processes, an operating system kernel, a virtual machine monitor (VMM) and its spawned virtual machines (VMs) execute in the user space. Notably, the microvisor executes at the highest privilege level of a central processing unit of the node to virtualize access to kernel resources. The operating system kernel executes under control of the microvisor at a privilege level lower than a highest privilege level of the microvisor. The VMM and its spawned VMs execute at the highest privilege level of the microvisor.

21 Claims, 6 Drawing Sheets

(56) References Cited

U.S. PATENT DOCUMENTS

| | | | |
|---|---|---|---|
| 8,479,286 B2 | 7/2013 | Dalcher et al. | |
| 8,479,292 B1 | 7/2013 | Li et al. | |
| 8,522,236 B2* | 8/2013 | Zimmer et al. | 718/1 |
| 8,775,715 B2 | 7/2014 | Tsirkin et al. | |
| 8,832,352 B2 | 9/2014 | Tsirkin et al. | |
| 8,839,245 B1 | 9/2014 | Khajuria et al. | |
| 9,003,402 B1* | 4/2015 | Carbone et al. | 718/1 |
| 9,092,625 B1* | 7/2015 | Kashyap | G06F 21/566 |
| 2003/0120856 A1 | 6/2003 | Neiger et al. | |
| 2005/0216759 A1 | 9/2005 | Rothman et al. | |
| 2006/0130060 A1 | 6/2006 | Anderson et al. | |
| 2006/0248528 A1* | 11/2006 | Oney et al. | 718/1 |
| 2007/0174915 A1 | 7/2007 | Gribble et al. | |
| 2007/0180454 A1* | 8/2007 | Fujimoto et al. | 719/320 |
| 2007/0300227 A1* | 12/2007 | Mall et al. | 718/102 |
| 2008/0028124 A1 | 1/2008 | Tago | |
| 2008/0065854 A1* | 3/2008 | Schoenberg et al. | 711/203 |
| 2008/0244206 A1 | 10/2008 | Heo et al. | |
| 2008/0294808 A1* | 11/2008 | Mahalingam et al. | 710/26 |
| 2009/0106754 A1* | 4/2009 | Liu et al. | 718/1 |
| 2009/0172661 A1* | 7/2009 | Zimmer et al. | 718/1 |
| 2010/0023810 A1 | 1/2010 | Stolfo et al. | |
| 2010/0254622 A1* | 10/2010 | Kamay et al. | 382/239 |
| 2010/0299665 A1* | 11/2010 | Adams | 718/1 |
| 2011/0004935 A1 | 1/2011 | Moffie et al. | |
| 2011/0047542 A1 | 2/2011 | Dang et al. | |
| 2011/0047544 A1* | 2/2011 | Yehuda et al. | 718/1 |
| 2011/0153909 A1 | 6/2011 | Dong | |
| 2011/0167422 A1* | 7/2011 | Eom et al. | 718/1 |
| 2011/0296412 A1 | 12/2011 | Banga et al. | |
| 2011/0314546 A1 | 12/2011 | Aziz et al. | |
| 2012/0047580 A1 | 2/2012 | Smith et al. | |
| 2012/0254995 A1 | 10/2012 | Sallam | |
| 2012/0255002 A1 | 10/2012 | Sallam | |
| 2012/0255016 A1 | 10/2012 | Sallam | |
| 2012/0255017 A1 | 10/2012 | Sallam | |
| 2012/0255021 A1 | 10/2012 | Sallam | |
| 2012/0311708 A1 | 12/2012 | Agarwal et al. | |
| 2013/0031374 A1 | 1/2013 | Thom et al. | |
| 2013/0055256 A1 | 2/2013 | Banga et al. | |
| 2013/0145471 A1 | 6/2013 | Richard et al. | |
| 2013/0191924 A1 | 7/2013 | Tedesco et al. | |
| 2013/0282776 A1* | 10/2013 | Durrant et al. | 707/827 |
| 2013/0305006 A1* | 11/2013 | Altman et al. | 711/163 |
| 2013/0333033 A1 | 12/2013 | Khesin | |
| 2013/0346966 A1 | 12/2013 | Natu et al. | |
| 2013/0347131 A1* | 12/2013 | Mooring et al. | 726/29 |
| 2014/0351810 A1* | 11/2014 | Pratt | G06F 9/45545 718/1 |

FOREIGN PATENT DOCUMENTS

| | | |
|---|---|---|
| WO | WO-2012/177464 A1 | 12/2012 |
| WO | WO-2014/004747 A2 | 1/2014 |
| WO | WO-2013/091221 A1 | 6/2015 |

OTHER PUBLICATIONS

Kosoresow, Andrew P., and Steven A. Hofmeyr. "Intrusion detection via system call traces." IEEE software 14.5 (1997): 35-42.

Hofmeyr, Steven A., Stephanie Forrest, and Anil Somayaji. "Intrusion detection using sequences of system calls." Journal of computer security 6.3 (1998): 151-180.

Chen, Peter M., and Brian D. Noble. "When virtual is better than real [operating system relocation to virtual machines]." Hot Topics in Operating Systems, 2001. Proceedings of the Eighth Workshop on. IEEE, 2001.

Garfinkel, Tal, and Mendel Rosenblum. "A Virtual Machine Introspection Based Architecture for Intrusion Detection." NDSS. 2003.

Gao, Debin, Michael K. Reiter, and Dawn Xiaodong Song. "On Gray-Box Program Tracking for Anomaly Detection." USENIX security symposium. 2004.

Laureano, Marcos, Carlos Maziero, and Edgard Jamhour. "Intrusion detection in virtual machine environments." Euromicro Conference, 2004. Proceedings. 30th. IEEE, 2004.

Levin, Thomas E., Cynthia E. Irvine, and Thuy D. Nguyen. Least privilege in separation kernels. Naval Postgraduate School Monterey CA Dept of Computer Science, 2006.

Jones, Stephen T., Andrea C. Arpaci-Dusseau, and Remzi H. Arpaci-Dusseau. "Antfarm: Tracking Processes in a Virtual Machine Environment." USENIX Annual Technical Conference, General Track. 2006.

Jiang, Xuxian, Xinyuan Wang, and Dongyan Xu. "Stealthy malware detection through vmm-based out-of-the-box semantic view reconstruction." Proceedings of the 14th ACM conference on Computer and communications security. ACM, 2007.

Stumpf, Frederic, et al. "An approach to a trustworthy system architecture using virtualization." Autonomic and trusted computing. Springer Berlin Heidelberg, 2007. 191-202.

Huang, Yih, et al. "Efficiently tracking application interactions using lightweight virtualization." Proceedings of the 1st ACM workshop on Virtual machine security. ACM, 2008.

Nguyen, Anh M., et al. "Mavmm: Lightweight and purpose built vmm for malware analysis." Computer Security Applications Conference, 2009. ACSAC'09. Annual. IEEE, 2009.

Heiser, Gernot, and Ben Leslie. "The OKL4 Microvisor: Convergence point of microkernels and hypervisors." Proceedings of the first ACM asia-pacific workshop on Workshop on systems. ACM, 2010.

Yan, Lok Kwong, et al. "Transparent and Extensible Malware Analysis by Combining Hardware Virtualization and Software Emulation." Internet Society, 2010. Downloaded from https://www.internetsociety.org/sites/default/files/05_1.pdf.

Kapravelos, Alexandros, et al. "Revolver: An Automated Approach to the Detection of Evasive Web-based Malware." USENIX Security Symposium. 2013.

Bromium Corp, "Bromium vSentry, Defeat of the Unknown Attack," downloaded from http://www.bromium.com/sites/default/files/Bromium-Whitepaper-vSentry_2.pdf on Dec 1, 2013.

Bromium Corp, "Live Attack Visualization and Analysis, What does a Malware attack look like?" http://www.bromium.com/sites/default/files/Bromium%20LAVA%20WP_2.pdf on Dec 1, 2013.

Amiri Sam, Ardalan, et al. "I/O paravirtualization at the device file boundary." *ACM SIGPLAN Notices* 49.4 (2014), pp. 319-332.

Iqbal, Asif, Nayeema Sadeque, and Rafika Ida Mutia. "An overview of microkernel, hypervisor and microvisor virtualization approaches for embedded systems." *Report, Department of Electrical and Information Technology*, Lund University, Sweden 2110 (2009), 15 Pages.

King, Samuel T., and Peter M. Chen. "SubVirt: Implementing malware with virtual machines." *Security and Privacy, 2006 IEEE Symposium on*. IEEE, 2006, 14 Pages.

Steinberg, Udo, and Bernhard Kauer. "NOVA: a microhypervisor-based secure virtualization architecture." *Proceedings of the 5th European conference on Computer systems*. ACM, 2010, 14 Pages.

Sun, Kun, et al. "SecureSwitch: BIOS-Assisted Isolation and Switch between Trusted and Untrusted Commodity OSes." George Mason Feb. 26, 2013, 15 Pages.

Wojtczuk, Rafal, "Subverting the Xen hypervisor." *Black Hat USA* 2008 (2008), 9 Pages.

"Bromium vSentry—Defeat the Unknown Attack," Oct. 10, 2013, 11 pages.

Iqbal, et al., "An Overview of Microkernel, Hypervisor and Microvisor Virtualization Approaches for Embedded Systems," Department of Electrical and Information Technology, Lund University, Sweden, Aug. 26, 2013, 15 pages.

PCT Notification of Transmittal of the International Search Report and the Written Opinion of the International Searching Authority, or the Declaration, International Searching Authority, International Application No. PCT/US2014/071847, mailed Mar. 26, 2015, 16 pages.

(56) References Cited

OTHER PUBLICATIONS

PCT Notification of Transmittal of the International Search Report and the Written Opinion of the International Searching Authority, or the Declaration, International Searching Authority, International Application No. PCT/US2014/071879, mailed /Apr. 28, 2015, 12 pages.

PCT Notification of Transmittal of the International Search Report and the Written Opinion of the International Searching Authority, or the Declaration, International Searching Authority, International Application No. PCT/US2014/071923, mailed Mar. 26, 2015, 13 pages.

Sun, et al., "SecureSwitch: BIOS-Assisted Isolation and Switch between Trusted and Untrusted Commodity OSes," Center for Secure Information Systems, George Mason University, Feb. 26, 2013, 15 pages.

\* cited by examiner

MICRO-VIRTUALIZATION ARCHITECTURE FOR THREAT-AWARE MICROVISOR DEPLOYMENT IN A NODE OF A NETWORK ENVIRONMENT

RELATED APPLICATION

The present application claims priority from commonly owned Provisional Patent Application No. 61/928,323, entitled Exploit Detection System with Threat-Aware Microvisor, filed on Jan. 16, 2014, the contents of which are incorporated herein by reference.

BACKGROUND

1. Technical Field

The present disclosure relates to virtualization systems and, more specifically, to a micro-virtualization architecture for deploying a threat-aware microvisor of a virtualization system.

2. Background Information

A virtual machine monitor (VMM) or hypervisor may be a hardware or software entity configured to create and run a software implementation of a computing platform or machine, i.e., a virtual machine. The hypervisor may be implemented as a type 1 VMM executing directly on native hardware of the computing platform, or a type 2 VMM executing within an operating system environment of the platform. The hypervisor may be further deployed in a virtualization system that fully simulates (virtualizes) physical (hardware) resources of the computing platform. Such a full virtualization system may support execution of a plurality of operating system instances inside a plurality of virtual machines, wherein the operating system instances share the hardware resources of the platform. The hypervisor of the full virtualization system may manage such sharing by hiding the hardware resources of the computing platform from users (e.g., application programs) executing on each operating system instance and, instead, providing an abstract, virtual computing platform. For example, a hardware resource, such as a network interface card (NIC), may be shared by enabling each virtual machine (and its operating system instance) to access a virtualized instance of the resource, i.e., a virtual NIC.

Alternatively, the hypervisor may be deployed in a virtualization system that supports a single computer program or process running inside of a virtual machine. Yet, this type of virtualization system typically implements a language virtual machine environment configured specifically for a programming language, e.g., a Java virtual machine.

A prior implementation of a virtualization system includes a special virtual machine and a hypervisor that creates other virtual machines, each of which executes an independent instance of an operating system. Malicious code may be prevented from compromising resources of the system through the use of policy enforcement and containment analysis that isolates execution of the code within a virtual machine to block or inhibit its execution within the system (i.e., outside of the virtual machine). However, this implementation duplicates program code and data structures for each instance of the operating system that is virtualized. In addition, the policy enforcement and containment may be directed to active (often computationally intensive) analysis of operating system data streams (typically operating system version and patch specific) to detect anomalous behavior.

Accordingly, there is a need for an enhanced virtualization system that detects anomalous behavior of malware (e.g., exploits and other malicious code threats) and collects analytical information relating to such behavior in a light-weight manner.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

DESCRIPTION OF ILLUSTRATIVE EMBODIMENTS

Figure 1:
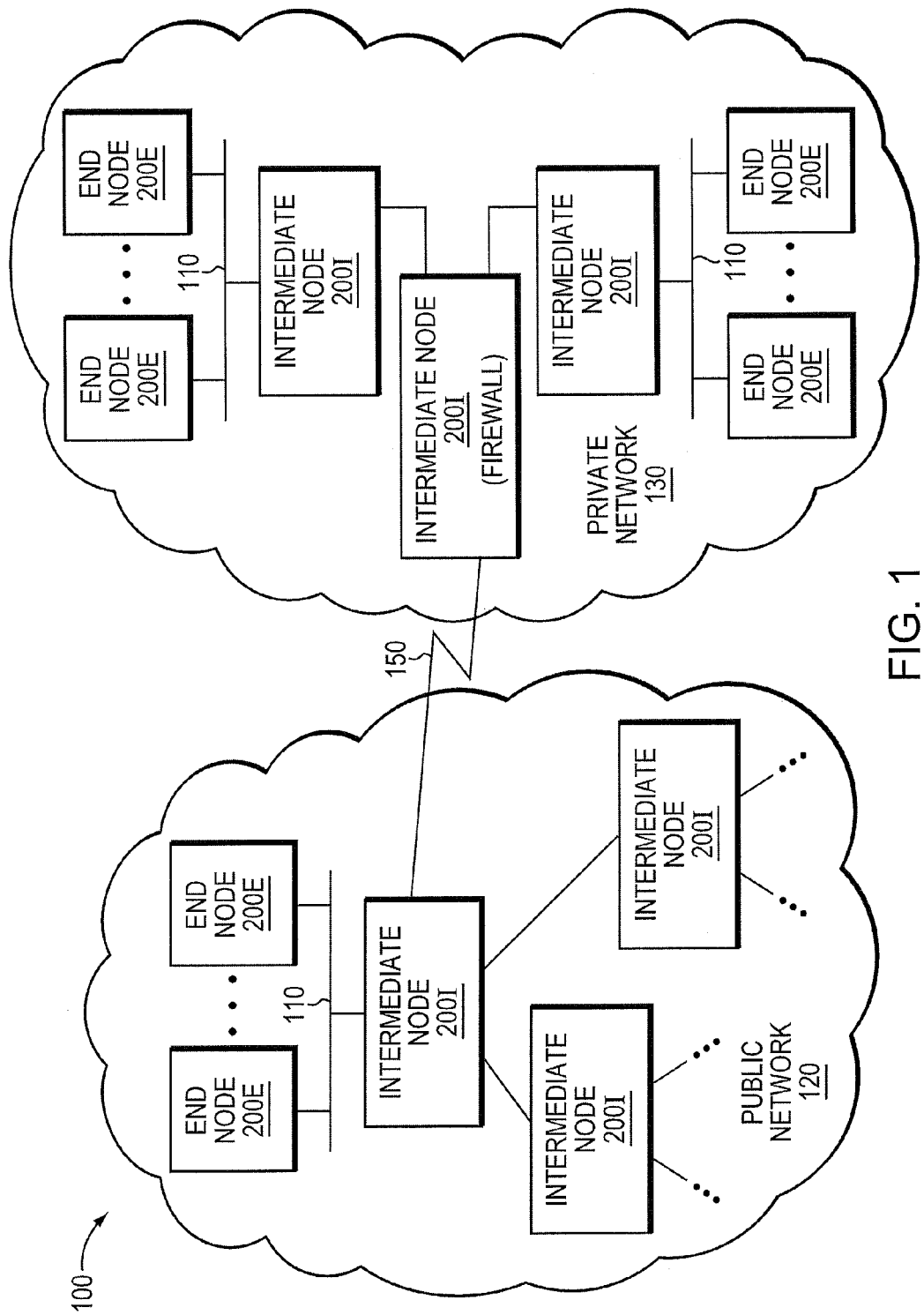
FIG. 1 is a block diagram of a network environment that may be advantageously used with one or more embodiments described herein.

The embodiments described herein provide a micro-virtualization architecture that deploys a threat-aware microvisor as a module of a virtualization system configured to facilitate real-time security analysis, including exploit detection and threat intelligence, of operating system processes executing on a node of a network environment. The threat-aware microvisor (hereinafter "microvisor") may be embodied as a light-weight module disposed beneath (underlying) an operating system kernel of the node to thereby control privileges (i.e., access permissions) to kernel resources, such as one or more central processing units (CPUs), network interfaces, memory, and/or devices, of the node. Illustratively, the microvisor may be configured to control access to one or more of the resources in response to a request by an operating system process to access the resource.

In an embodiment, the microvisor may communicate with a type 0 virtual machine monitor (VMM 0) over a privileged interface. VMM 0 is illustratively a pass-through module configured to expose the kernel resources of the node to the operating system kernel. To that end, VMM 0 may instantiate a virtual machine (e.g., VM 0) as a container for the operating system kernel and its kernel resources, wherein VM 0 includes instrumentation logic directed to detecting anomalous behavior which may be used in determining an exploit in any suspicious operating system process. The VMM 0 may also include instrumentation logic configured to analyze one or more interception points originated by the operating system process to invoke services of the operating system kernel. The instrumentation logic of VMM 0 may analyze the interception point to determine whether it is suspicious and, if so, instantiate (spawn) one or more "micro" virtual machine (VMs) that cooperate with the microvisor to detect anomalous behavior which may be used in determining an exploit.

Such spawning may result in creation of another module (i.e., micro-VM 1) that is substantially similar to VM 0, but with different (e.g., additional) instrumentation logic. Similar to VM 0, the micro-VM 1 may be configured to communicate with the microvisor over the privileged interface. Notably, the privileged interface may be embodied as a set of defined hyper calls.

The operating system kernel may be configured to include an operating system (OS) specific VMM extension adapted to communicate with VMM 0. The OS specific VMM extension illustratively contains logic configured to provide an interface to VMM 0 (and, in particular, its instrumentation logic) that allows introspection (examination and/or interception) of contents of internal structures of the operating system kernel. Such introspection may involve examination of data structures of the operating system in a manner that obviates duplication of those structures. Illustratively, VMM 0 may communicate with the operating system kernel (i.e., the OS specific VMM extension) over a defined application programming interface interface.

In an embodiment, the micro-virtualization architecture organizes the memory as a user space and kernel space, wherein the microvisor executes in the kernel space of the architecture, while the operating system processes, the operating system kernel, VMM 0 and its spawned VMs (e.g., VM 0 and micro-VM 1) execute in the user space. Notably, the microvisor executes at the highest privilege level of the CPU to thereby virtualize access to the kernel resources in a lightweight manner that does not share those resources among the operating system processes (such as user mode processes) when requesting the services of the operating system kernel. The operating system kernel illustratively executes under control of the microvisor at a privilege level lower than a highest privilege level of the microvisor, which controls access to the kernel resources for any operating system process (kernel or user mode). As a type 0 virtual machine monitor, VMM 0 (and its spawned VM 0 and micro-VM 1) execute at the highest privilege level of the microvisor. That is, VMM 0 (and its spawned VM 0 and micro-VMs) may operate under control of the microvisor at the highest microvisor privilege level, but may not directly operate at the highest CPU privilege level.

Description

FIG. 1 is a block diagram of a network environment 100 that may be advantageously used with one or more embodiments described herein. The network environment 100 illustratively includes a plurality of computer networks organized as a public network 120, such as the Internet, and a private network 130, such an organization or enterprise network. The networks 120, 130 illustratively include a plurality of network links and segments connected to a plurality of nodes 200. The network links and segments may include local area networks (LANs) 110 and wide area networks (WANs) 150 interconnected by intermediate nodes 200$_I$, such as network switches or routers, to form an internetwork of nodes. The LANs 110 may, in turn, interconnect end nodes 200$_E$ embodied as endpoints. In an embodiment, the endpoints may illustratively include, e.g., client/server desktop computers, laptop/notebook computers, process controllers, medical devices, data acquisition devices, mobile devices, such as smartphones and tablet computers, and/or any other intelligent electronic device having network connectivity that may be configured to implement a virtualization system. The nodes 200 illustratively communicate by exchanging packets or messages (i.e., network traffic) according to a predefined set of protocols, such as the Transmission Control Protocol/Internet Protocol (TCP/IP); however, it should be noted that other protocols, such as the HyperText Transfer Protocol (HTTP), may be advantageously used with the embodiments herein. In the case of private network 130, the intermediate node 200$_I$ may include a firewall or other network device configured to limit or block certain network traffic to protect the endpoints from unauthorized users.

Figure 2:
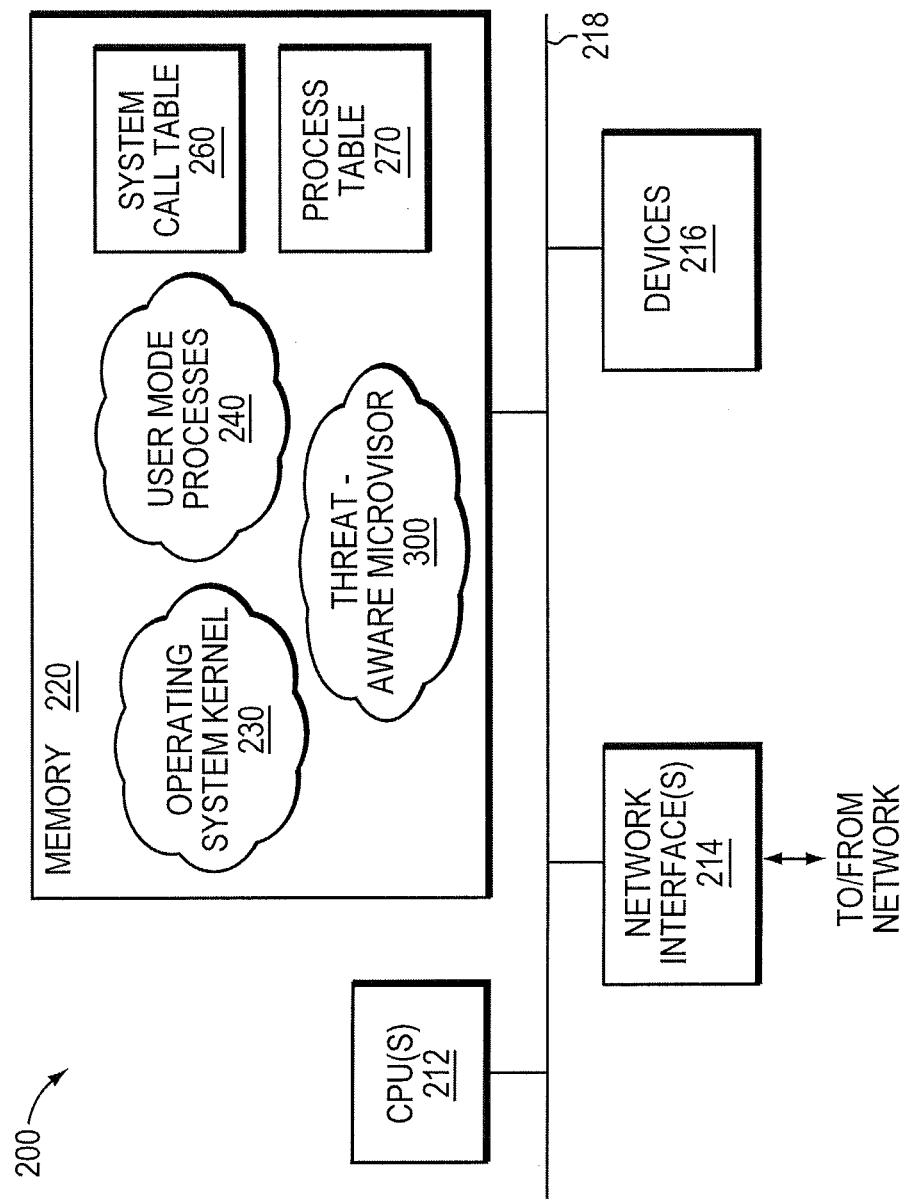
FIG. 2 is a block diagram of a node that may be advantageously used with one or more embodiments described herein.

FIG. 2 is a block diagram of a node 200, e.g., an end node 200$_E$ or intermediate node 200$_I$, that may be advantageously used with one or more embodiments described herein. The node 200 illustratively includes one or more central processing unit (CPUs) 212, a memory 220, one or more network interfaces 214 and one or more devices 216 connected by a system interconnect 218, such as a bus. The devices 216 may include a human interface device (such as a keyboard, trackball or mouse), storage devices, and/or other types of input/output (I/O) or peripheral devices. Each network interface 214 may contain the mechanical, electrical and signaling circuitry needed to connect the node to the network 120, 130 to thereby facilitate communication over the network. To that end, the network interface 214 may be configured to transmit and/or receive messages using a variety of communication protocols including, inter alia, TCP/IP and HTTP.

The memory 220 may include a plurality of locations that are addressable by the CPU(s) 212 and the network interface(s) 214 for storing software program code (including application programs) and data structures associated with the embodiments described herein. The CPU 212 may include processing elements or logic adapted to execute the software program code, such as threat-aware microvisor 300, and manipulate the data structures, such as system call table 260 and process table 270. Exemplary CPUs may include families of instruction set architectures based on the x86 CPU from Intel Corporation of Santa Clara, Calif. and the x64 CPU from Advanced Micro Devices of Sunnyvale, Calif.

An operating system kernel 230, portions of which are typically resident in memory 220 and executed by the CPU, functionally organizes the node by, inter alia, invoking operations in support of the application programs executing on the node. A suitable operating system kernel 230 may include the Windows® series of operating systems from Microsoft Corp of Redmond, Wash., the MAC OS® and IOS® series of operating systems from Apple Inc. of Cupertino, Calif. and versions of the Android™ operating system from Google, Inc. of Mountain View, Calif., among others. Suitable application programs may include Adobe Reader® from Adobe Systems Inc. of San Jose, Calif. and Microsoft Word from Microsoft Corp of Redmond, Wash. Illustratively, the application programs may be implemented via user mode processes 240 of the kernel 230. As used herein, a process (e.g., a user mode process) is an instance of software program code (e.g., an application program) executing in the operating system that may be separated (decomposed) into a plurality of threads, wherein each thread is a sequence of execution within the process.

It will be apparent to those skilled in the art that other types of processing elements and memory, including various computer-readable media, may be used to store and execute program instructions pertaining to the embodiments described herein. Also, while the embodiments herein are described in terms of software program code and computer, e.g., application, programs stored in memory, alternative embodiments also include the code/programs being embodied as modules consisting of hardware, software, firmware, or combinations thereof.

Threat-Aware Microvisor

Figure 3:
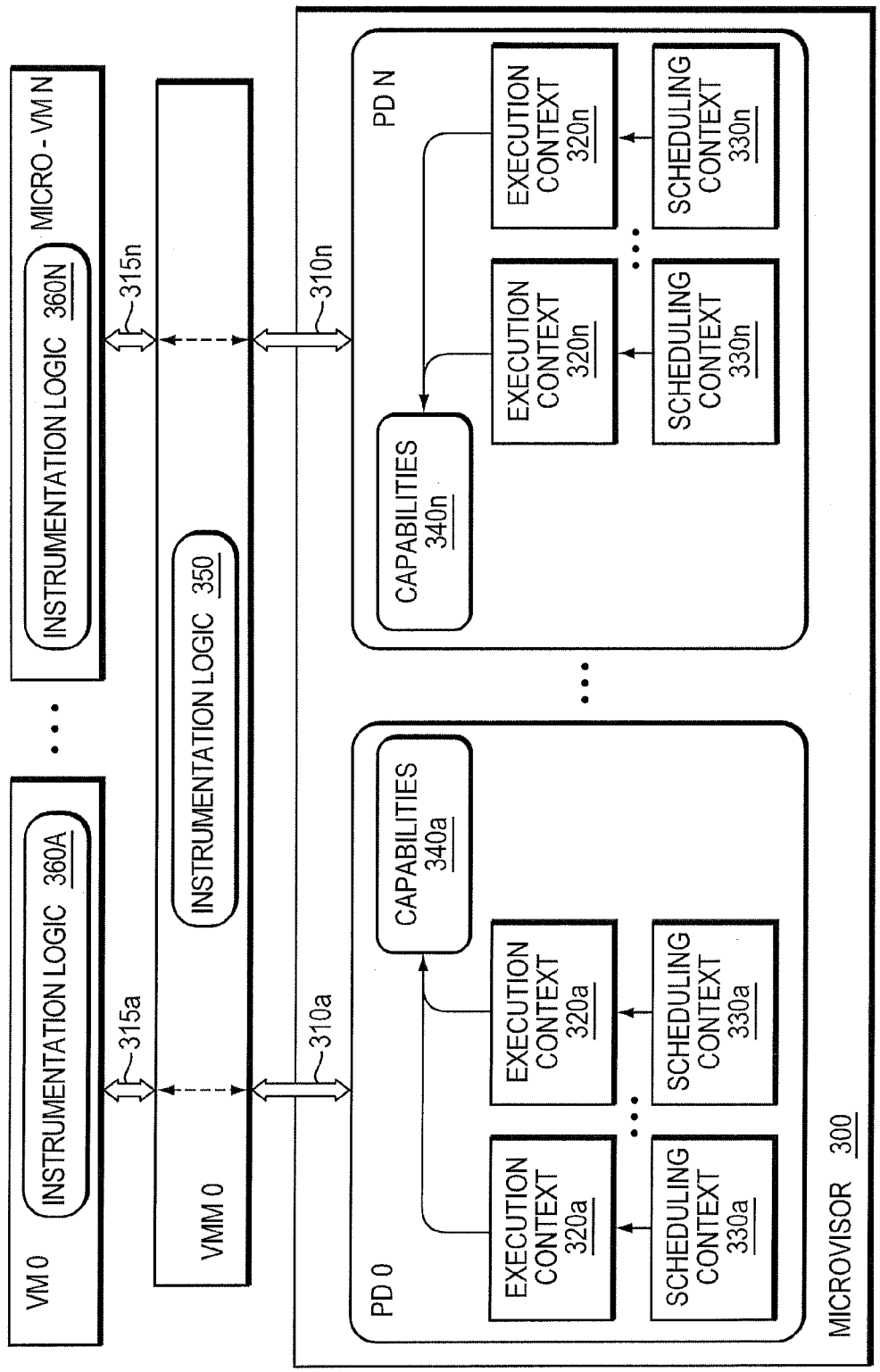
FIG. 3 is a block diagram of a threat-aware microvisor that may be advantageously used with one or more embodiments described herein.

FIG. 3 is a block diagram of the threat-aware microvisor 300 that may be advantageously used with one or more embodiments described herein. The threat-aware microvisor (hereinafter "microvisor") may be configured to facilitate real-time security analysis, including exploit detection and threat intelligence, of operating system processes executing on the node 200. To that end, the microvisor may be embodied as a light-weight module disposed or layered beneath (underlying, i.e., directly on native hardware) the operating system kernel 230 of the node to thereby virtualize the hardware and control privileges (i.e., access control permissions) to kernel (e.g., hardware) resources of the node 200 that are typically controlled by the operating system kernel. Illustratively, the kernel resources may include (physical) CPU(s) 212, memory 220, network interface(s) 214, and devices 216. The microvisor 300 may be configured to control access to one or more of the resources in response to a request by an operating system process to access the resource.

As a light-weight module, the microvisor may provide a virtualization layer having less functionality than a typical hypervisor. Accordingly, the microvisor may cooperate with a unique virtual machine monitor (VMM), i.e., a type 0 VMM, to provide additional virtualization functionality in an operationally and resource efficient manner. Unlike a type 1 or type 2 VMM (hypervisor), the type 0 VMM (VMM 0) does not fully virtualize the kernel (hardware) resources of the node and supports execution of only one entire operating system/instance inside one virtual machine, i.e., VM 0. VMM 0 may thus instantiate VM 0 as a container for the operating system kernel 230 and its kernel resources. In an embodiment, VMM 0 may instantiate VM 0 as a module having instrumentation logic 360A directed to determination of an exploit in any suspicious operating system process (kernel or user mode). Illustratively, VMM 0 is a pass-through module configured to expose the kernel resources of the node (as controlled by microvisor 300) to the operating system kernel 230. VMM 0 may also expose resources such as virtual CPUs (threads), wherein there is one-to-one mapping between the number of physical CPUs and the number of virtual CPUs that VMM 0 exposes to the operating system kernel 230. To that end, VMM 0 may enable communication between the operating system kernel (i.e., VM 0) and the microvisor over privileged interfaces 315a and 310a.

The VMM 0 may include software program code (e.g., executable machine code) in the form of instrumentation logic 350 (including decision logic) configured to analyze one or more interception points originated by one or more operating system processes to invoke the services, e.g., accesses to the kernel resources, of the operating system kernel 230. As used herein, an interception point is a point in an instruction stream where control passes to (e.g., is intercepted by) either the microvisor, VMM 0 or another virtual machine. An interception point may thus include, inter alia, a memory access request, a function call or a system call. For example in response to an interception point, VMM 0 may assume control over the operating system kernel 230 to enable monitoring of activity (including examination of a state) of the process to determine its suspiciousness and to enable detection of exploits or other potentially malicious behavior of malware. Suspiciousness may thus denote anomalous behavior of a process or its interception point (e.g., system call) that is not expected during run-time and, therefore, may indicate a certain probability of being an exploit.

An exploit may thus be construed broadly as information (e.g., executable code, data, one or more commands) that attempts to take advantage of a computer program or system vulnerability. Typically, a vulnerability may be a coding error or artifact of a computer program that allows an attacker to alter legitimate control flow during processing of the computer program by an electronic device and, thus, causes the electronic device to experience undesirable or unexpected behaviors. The undesired or unexpected behaviors may include a communication-based or execution-based anomaly which, for example, could (1) alter the functionality of the electronic device executing application software in a malicious manner; (2) alter the functionality of the electronic device executing the application software without any malicious intent; and/or (3) provide unwanted functionality which may be generally acceptable in another context. To illustrate, a computer program may be considered a state machine where all valid states (and transitions between states) are managed and defined by the program, in which case an exploit may be viewed as seeking to alter one or more of the states (or transitions) from those defined by the program. Malware may be construed broadly as computer code that executes an exploit or harms or coopts operation of an electronic device or misappropriates, modifies or deletes data. Conventionally, malware may often be designed with malicious intent.

As described herein, a system call provides an interception point at which a switch in privilege levels occurs in the operating system, i.e., from a privilege level of the user mode process to a privilege level of the operating system kernel. VMM 0 may intercept the system call and examine a state of the process issuing (sending) the call. The instrumentation logic 350 of VMM 0 may analyze the system call to determine whether the call is suspicious and, if so, instantiate (spawn) one or more "micro" virtual machines (VMs) equipped with monitoring functions that cooperate with the microvisor to detect anomalous behavior which may be used in determining an exploit. As used herein, the term "micro" VM denotes a virtual machine serving as a container that is restricted to a process (as opposed to VM 0 which is spawned as a container for the entire operating system.) Such spawning of a micro-VM may result in creation of an instance of another module (i.e., micro-VM N) that is substantially similar to VM 0, but with different (e.g., additional) instrumentation logic 360N illustratively directed to determination of an exploit in the suspicious process by, e.g., monitoring its behavior. In an embodiment, the spawned micro-VM illustratively encapsulates an operating system process, such as user mode process 240. In terms of execution, operation of the process is controlled and synchronized by the operating system kernel 230; however, in terms of access to kernel resources, operation of the encapsulated process is controlled by VMM 0. Notably, there is no sharing of kernel resources among spawned micro-VMs, i.e., the resources accessible to a process encapsulated in a spawned micro-VM are the same resources accessible by any spawned micro-VM as well as VM 0 and VMM 0. In other words, access to kernel resources is synchronized among the micro-VMs and VM 0 by VMM 0 rather than virtually shared. Accordingly, VMM 0 may contain computer executable instructions executed by the CPU 212 to perform operations that initialize and implement the instrumentation logic 350, as well as operations that spawn, configure and control VM 0 and any of a plurality of micro-VMs (including instrumentation logic 360A-N). Similar to VM 0, each micro-VM may be configured to communicate with the microvisor (via VMM 0) over privileged interfaces 315n and 310n. Notably, the privileged interfaces 310a-n and 315a-n may be embodied as a set of defined hyper-calls, as described further herein.

In an embodiment, the microvisor 300 may be organized to include a plurality of protection domains (e.g., PD 0-N) illustratively bound to VM 0 and one or more micro-VMs, respectively. As used herein, a protection domain is a container for various data structures, such as execution contexts, scheduling contexts, and capabilities associated with the kernel resources accessible by an operating system process. Illustratively, the protection domain may function at a granularity of an operating system process (e.g., a user mode process 240) and, thus, is a representation of the process. Accordingly, the microvisor may provide a protection domain for the process and its run-time threads executing in the operating system. The main protection domain (PD0) of the microvisor controls all of the kernel resources available to the operating system kernel 230 (and, hence, the user mode process 240) of VM 0 via VMM 0 and, to that end, may be associated with the services provided to the user mode process by the kernel 230. The spawned micro-VM (e.g., micro-VM N) is illustratively associated with (bound to) a copy of PD 0 (e.g., PD N) which, in turn, may be bound to the process, wherein such binding may occur through memory context switching.

In response to a decision to spawn the micro-VM N, VMM 0 may issue a hyper-call over interface 310a to the microvisor requesting creation of the protection domain PD N. Upon receiving the hyper-call, the microvisor 300 may copy (i.e., "clone") the data structures (e.g., execution contexts, scheduling contexts and capabilities) of PD 0 to create PD N for the micro-VM N, wherein PD N has essentially the same structure as PD 0 except for the capabilities 340n associated with the kernel resources. As used herein, a capability is a protection (access control permission) associated with a kernel resource. For example, the capabilities 340n for PD N may limit or restrict access to one or more of the kernel resources as instructed through one or more hyper-calls from, e.g., VMM 0 and/or micro-VM N over interface 310a,n to the microvisor. Accordingly, the microvisor 300 may contain computer executable instructions executed by the CPU 212 to perform operations that initialize, clone and configure the protection domains. As a result, each protection domain PD 0-N may include one or more execution contexts 320a-n, each of which is tightly linked to a respective scheduling context 330a-n. Each execution context 320a-n further interacts with the capabilities 340a-n, whose contents specify access control permissions (i.e., protecting access) to the kernel resources. Illustratively, the capabilities may be organized as a list of access permissions for each kernel resource.

As used herein, an execution context 320 is illustratively a representation of a thread (associated with an operating system process) and, to that end, defines a state of the thread for execution on CPU 212. In an embodiment, the execution context may include inter alia (i) contents of CPU registers, (ii) pointers/values on a stack, (iii) a program counter, and/or (iv) allocation of memory via, e.g., memory pages. The execution context 320 is thus a static view of the state of thread and, therefore, its associated process. Accordingly, the thread executes within the protection domain associated with the operating system process of which the thread is a part. For the thread to execute on a CPU 212 (e.g., as a virtual CPU), its execution context 320 is tightly linked to a scheduling context 330, which may be configured to provide information for scheduling the execution context 320 for execution on the CPU 212. Illustratively, the scheduling context information may include a priority and a quantum time for execution of its linked execution context on CPU 212.

In an embodiment, the capabilities 340 may be organized as a set of access control permissions to the kernel resources to which the thread may request access. Thus, each time the execution context 320 of a thread requests access to a kernel resource, the capabilities 340 are examined. There is illustratively one set of capabilities 340 for each protection domain, such that access to kernel resources by each execution context 320 (i.e., each thread of an execution context) of a protection domain may be defined by the set of capabilities 340. For example, physical addresses of pages of memory 220 (resulting from mappings of virtual addresses to physical addresses) may have associated access permissions (e.g., read, write, read-write) within the protection domain. To enable an execution context 320 to access a kernel resource, such as a memory page, the physical address of the page may have a capability 340 that defines how the execution context 320 may reference that page. Illustratively, the capabilities may be examined by hardware (e.g., a hardware page fault upon a memory access violation) or by program code. As described herein, violation of a capability in a protection domain may be an interception point, which returns control to the VM (e.g., VM 0 or micro-VM N) bound to the protection domain.

Advantageously, the microvisor 300 may be organized as separate protection domain containers for the operating system kernel 230 (PD 0) and one or more operating system processes (PD N) to facilitate further monitoring and understanding of behaviors of the process and its threads. Such organization of the microvisor also enforces separation between the protection domains to control the activity of the monitored process. Moreover, the microvisor 300 may enforce access to the kernel resources through the use of variously configured capabilities 340 of the separate protection domains. Unlike previous virtualization systems, separation of the protection domains to control access to kernel resources at a process granularity enables detection of anomalous behavior of an exploit. That is, in addition to enforcing access to kernel resources, the microvisor enables analysis of the operation of a process within a spawned micro-VM to detect exploits or other malicious code threats that may constitute malware.

Assume a user mode process 240 has one or more threads that run on one or more CPUs 212. Each thread has an associated execution context 320 that defines its state. When executing on a CPU 212, the thread may attempt to access a resource (a memory page). VMM 0 may instruct the microvisor 300 to configure the access permission to the memory page according to a definition of the capability within the protection domain bound to the process executing the thread. Assume further that the capability specifies that a protection domain (e.g., PD 0) can have only read-only access to the memory page. If the CPU 212 attempts to write to that memory, i.e., a write access, a trap (e.g., an exception, such as a page fault or general protection fault) may be generated by the CPU and the microvisor 300 may report the trap (via an exception handler) to VMM 0. VMM 0 may decide that such write access should be allowed and instructs the microvisor to allow the access. Alternatively, VMM 0 may decide that such write access warrants further analysis and spawns micro-VM N. VMM 0 may then issue a hyper-call to the microvisor 300 requesting cloning of PD 0 to create PD N (for the spawned micro-VM N) and further requesting a different set of capabilities for PD N to further monitor the process 240 (i.e., the capabilities of the protection domain bound to micro-VM N may be altered). In an embodiment, the different set of capabilities may be specified by instrumentation logic 360N of the spawned micro-VM N. The instrumentation logic 360N may specify the different set of capabilities (via one or more hyper-calls over interfaces 315n, 310n) in order to receive further reports of any violations of capabilities (e.g., traps) and then specify the type of action to take in response to those reports.

For example, the instrumentation logic 350 of VMM 0 may specify a set of capabilities for PD 0 (via a hyper-call) that is different from the capabilities specified for PD N by the instrumentation logic 360N of micro-VM N (via a different hyper-call). Illustratively, the capabilities of PD N may be more restricted than those of PD 0 in order to capture behavior not otherwise monitored by PD 0. Nevertheless, PD 0 may have temporarily elevated protection requiring limited capabilities due to, e.g., a malicious rootkit executing in the operating system kernel 230. In an embodiment, the different set of capabilities requested by micro-VM N for the cloned PD N may pertain to certain kernel resources, such as memory regions (as opposed to memory pages of the regions). Here, the capabilities may not be configured to define access permissions at the granularity of memory pages (e.g., 4K bytes) because of the substantial memory resources (i.e., page table entries) needed to accommodate sufficient pages to cover large memory regions. Accordingly, in an embodiment, a region of memory may be associated with certain permissions (read-only, write-only) as defined by the capabilities and micro-VM N may subsequently "fine-grain" (e.g., enlarge or shrink) that memory region to enable read or write only permissions to memory pages within the region.

Figure 4:
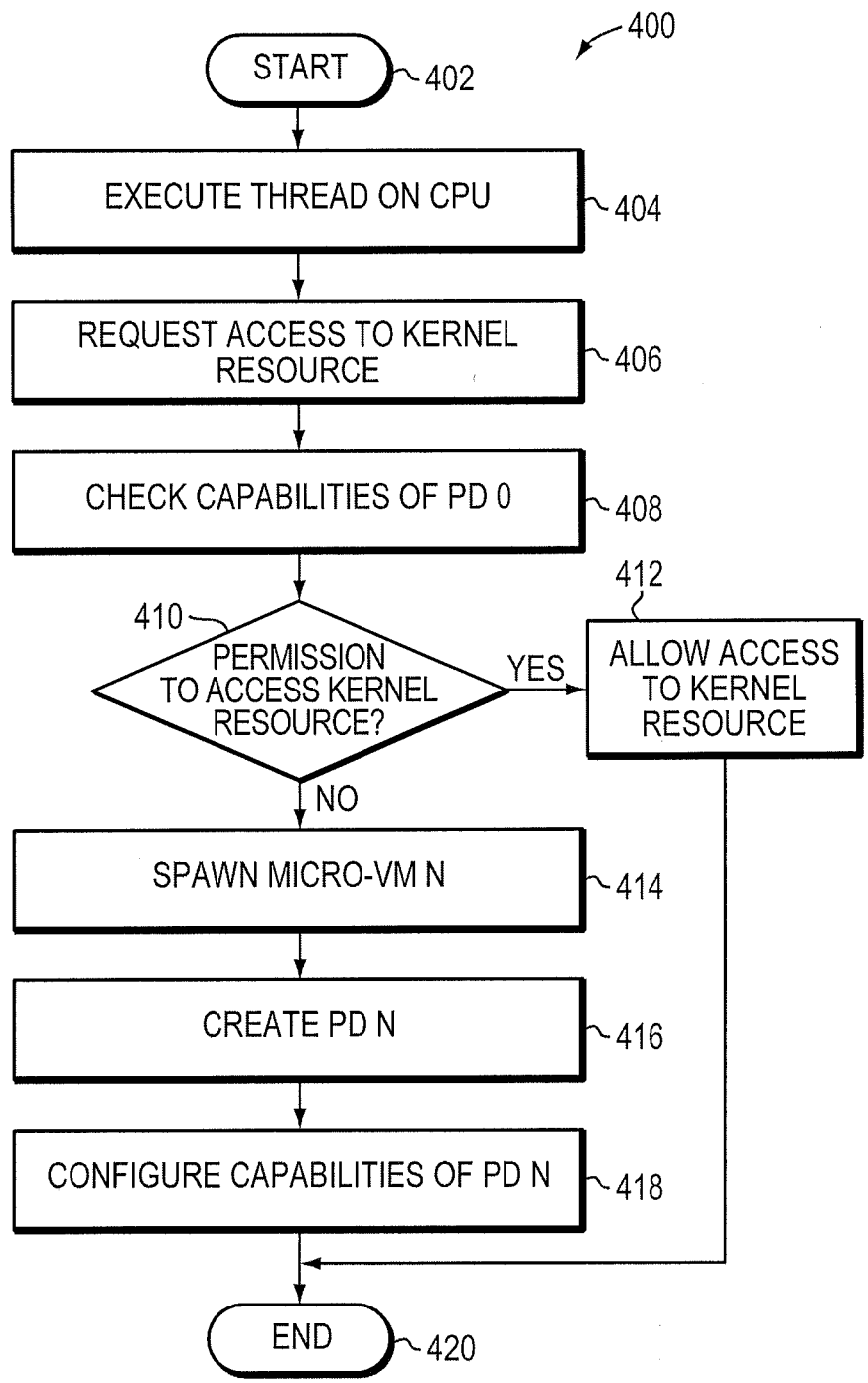
FIG. 4 is an example simplified procedure for configuring the threat-aware microvisor to control access permissions to kernel resources of the node.

FIG. 4 is an example simplified procedure for configuring the threat-aware microvisor to control access permissions to the kernel resources of the node. The procedure 400 starts at step 402 and proceeds to step 404 where a thread of a user mode process executes (under control of PD 0) on a CPU of the node. At step 406, the thread requests (via a system call to the operating system kernel) access to a kernel resource. At step 408, the CPU checks (e.g., programmatically or via hardware exception) the capabilities (permission) of PD 0 for the thread to access the requested resource. At step 410, a determination is made as to whether the thread has permission to access the resource. If so, the requested access is allowed at step 412 and the procedure ends at step 420. However, if the thread does not have the appropriate permission to access the resource, VMM 0 spawns a micro-VM (micro-VM N) to further analyze the call (and thread/process) at step 414. At step 416, VMM 0 instructs the microvisor (via a hyper-call) to create PD N by, e.g., cloning PD 0. At step 418, the microvisor configures PD N with capabilities that are more restricted than PD 0 with respect to access to the kernel resources by the thread/process so as to further monitor that thread/process via violations of the restricted capabilities, e.g., interception points. The procedure then ends at step 420.

In an embodiment, the spawned micro-VM N is generally equivalent to VM 0 and, therefore, exposes the kernel resources to the user mode process 240. Illustratively, the spawned micro-VM N is a copy of VM 0 that is restricted to monitoring (e.g., tracing) only that process 240. The instrumentation logic 360N of the spawned micro-VM N may be configured to perform further instrumentation on the potentially suspicious system call and, thus, may issue one or more hyper-calls over interfaces 315n, 310n to PD N requesting, e.g., more restricted changes to the capabilities 340n of PD N. Moreover, the micro-VM N may issue one or more additional hyper-calls to PD N to, e.g., trace other system calls sent by the process 240 to the operating system kernel 230.

Micro-Virtualization Architecture

Figure 5:
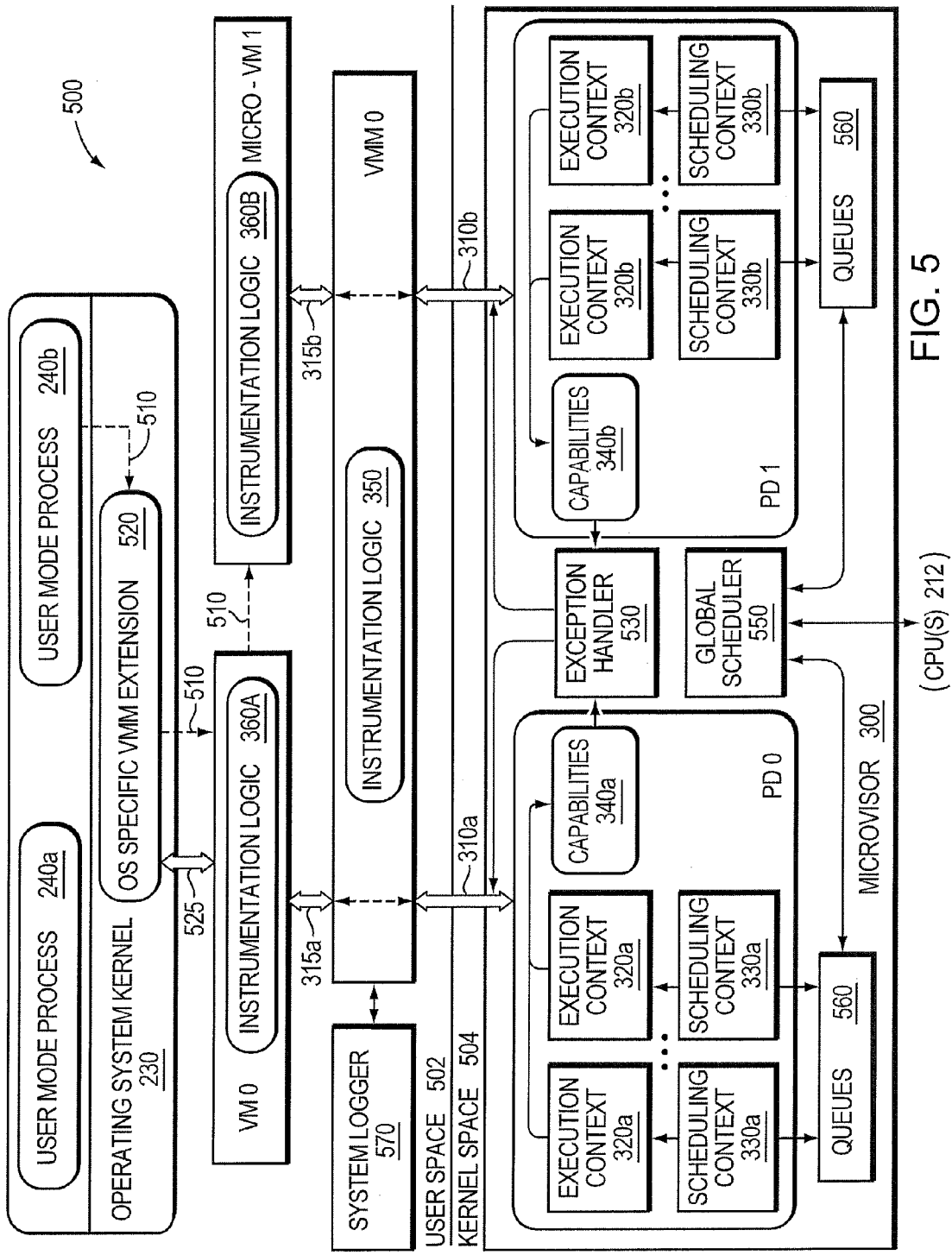
FIG. 5 is a block diagram of a micro-virtualization architecture that may be advantageously used with one or more embodiments described herein.

FIG. 5 is a block diagram of a micro-virtualization architecture 500 that may be advantageously used with one or more embodiments described herein. The micro-virtualization architecture may be configured to deploy the microvisor 300 as a module of a virtualization system, which may be enhanced to provide an exploit detection system executing on the node 200 of network environment 100. Illustratively, the micro-virtualization architecture 500 may organize the memory 220 as a user space 502 and a kernel space 504. In an embodiment, the microvisor may be disposed as a relatively small code base (approximately 9000-10,000 lines of code) that underlies the operating system kernel 230 and executes in the kernel space 504 of the architecture 500 to control access to the kernel resources (e.g., of the exploit detection system) for any operating system process (kernel or user mode). Notably, the microvisor 300 executes at the highest privilege level of the hardware (CPU) to thereby virtualize access to the kernel resources of the node in a light-weight manner that does not share those resources among the user mode processes 240 when requesting the services of the operating system kernel 230. That is, there is one-to-one mapping between the resources and the operating system kernel, such that the resources are not shared.

The user mode processes 240 and operating system kernel 230 may execute in the user space 502 of the micro-virtualization architecture 500, although it will be understood to those skilled in the art that the user mode processes may execute in another address space defined by the operating system kernel. Illustratively, the operating system kernel 230 may execute under control of the microvisor at a privilege level (i.e., a logical privilege level) lower than a highest privilege level of the microvisor, but at a higher CPU privilege level than that of the user mode processes 240. In addition, VMM 0 and its spawned VMs (e.g., VM 0 and micro-VM 1) may execute in user space 502 of the architecture 500 as processes having a relatively larger code base (approximately 20,000-30,000 lines of code) than the microvisor, primarily due to the instrumentation logic 350, 360. As a type 0 virtual machine monitor, VMM 0 (and its spawned VM 0 and micro-VMs) may execute at the highest (logical) privilege level of the microvisor. That is, VMM 0 (and its spawned VM 0 and micro-VMs) may operate under control of the microvisor at the highest microvisor privilege level, but may not directly operate at the highest CPU (hardware) privilege level.

As used herein, privileges are logical constructs illustratively defined by operations that may be performed (executed) at the various privilege levels of the micro-virtualization architecture 500. That is, operations that may be executed by the microvisor (at the highest CPU privilege level) may not be executed by VMM 0 at its privilege level. Similarly, operations that may be executed by VMM 0 (at the highest microvisor privilege level) may not be executed by the operating system kernel 230 (at a lower microvisor privilege level). As an example of the latter, VMM 0 may execute an operation (e.g., via a hyper-call) to instruct the microvisor to create (clone) a protection domain, whereas the operating system kernel may not execute such an operation. As described herein, operations of the various privilege levels are expressed and enforced through the use of capabilities 340 of the microvisor 300, i.e., privileges are bound to capabilities as configured at the microvisor. Illustratively, instrumentation logic 350, 360 may configure the capabilities 340 of the protection domains within the microvisor to enable analysis of interception points. For example, assume access to a memory page is configured (via capabilities) as read-only for a protection domain and a process attempts to write to that memory page. Such a memory access request is an example of an interception point, which may cause (trigger) a violation of a capability (e.g., a trap) and which may result in analysis of the process and the request by, e.g., switching between the privilege levels of the architecture 500.

As used herein, a hyper-call is generally similar to a system call, with a primary difference that the request for service is directed to the microvisor instead of the operating system kernel. Specifically, the micro-virtualization architecture 500 provides a small, limited set of hyper-calls, each having limited arguments, as a way to switch between privilege levels of the architecture. Whereas a system call may enable switching between a user mode level (e.g., of user mode process 240) and a kernel level (e.g., of operating system kernel 230) of the operating system, a hyper-call enables switching from user space 502 to kernel space 504 of the micro-virtualization architecture 500.

In an embodiment, the hyper-calls are embodied as inter process communication (IPC) messages exposed (available) to VMM 0, VM 0 and any spawned micro-VMs. The hyper-calls are generally originated by VMM 0 and directed to the microvisor 300 over privileged interface 310, although VM 0 and the micro-VMs may also originate one or more hyper-calls (IPC messages) directed to the microvisor over privileged interface 315. However, the hyper-calls originated by VM 0 and the micro-VMs may be more restricted than those originated by VMM 0. For example, micro-VM 1 may attempt to issue a hyper-call that instructs the microvisor to create (clone) a protect domain, but the capabilities 340b of protection domain PD 1 (which is bound to micro-VM 1) may limit or preclude successful execution of such a hyper-call. In contrast, the hyper-calls are not available to the operating system kernel 230 and, as such, the kernel may not issue such calls to the microvisor.

The operating system kernel 230 may be configured to include an operating system (OS) specific VMM extension 520 adapted to communicate with VMM 0. The OS specific VMM extension 520 illustratively contains executable machine code in the form of logic configured to provide an interface to VMM 0 (and, in particular, the instrumentation logic 350) that allows introspection (examination and/or interception) of contents of internal structures of the operating system kernel 230. Such introspection may involve examination of data structures of the operating system kernel in a manner that obviates duplication of (i.e., without duplicating) those structures. Accordingly, the OS specific VMM extension 520 may contain computer executable instructions executed by the CPU 212 to perform operations that implement communication with, and introspection by, VMM 0. For example, assume it is desirable to acquire identifications (IDs) of the user mode processes 240 running in the operating system and that the process IDs are stored in a data structure, e.g., the process table 270, of the operating system kernel 230. Instead of having to duplicate that data structure and its contents, the VMM 0 can instruct the OS specific VMM extension 520 to examine the process table 270 and provide the ID of a process 240. Illustratively, VMM 0 may communicate with the operating system kernel 230 (i.e., the OS specific VMM extension 520) over a defined application programming interface (API) 525.

As noted, the execution context 320 of a thread (e.g., of a user mode process 240) executing on a CPU 212 (e.g., as a virtual CPU) is tightly linked to a scheduling context 330. In an embodiment, the scheduling context 330 may include information defining a priority of execution for its linked execution context, e.g., as implemented by one or more queues 560. Once linked to its execution context 320, the scheduling context 330 may be placed (inserted) onto an appropriate queue 560 having a defined priority of execution. A global scheduler 550 of the microvisor may cooperate with the scheduling context 330 to schedule the context for execution on a CPU 212. Multiple execution contexts 320 may be bound to a same CPU 212 or multiple CPUs 212. Illustratively, the global scheduler 550 manages the queues 560 of scheduling contexts to thereby manage the CPUs 212 in an orderly manner. To that end, the global scheduler 550 may examine the queues 560 and determine which scheduling context 330 (execution context 320) may run on which CPU 212. The global scheduler 550 may then dispatch the scheduling context 330 to the appropriate CPU 212 for execution of its linked execution context 320.

In an embodiment, the microvisor 300 may be configured to perform scheduling of execution contexts 320 and verification of operational requests by the execution contexts with respect to capabilities 340. If there is a violation of the capabilities for a protection domain, a trap (e.g., an exception, such as a page fault or general protection fault) may be generated by the CPU (or other hardware) and serviced by an exception handler 530 of the microvisor. For example, if a process 240 attempts to access a resource to which the capability specifies it does not have permission, the CPU may generate the trap and the exception handler may report the violation to, e.g., VMM 0 for analysis. In addition, the microvisor may provide VMM 0 with state information associated with the execution context 320 executing at the time of the trap. The capability violation may trigger invocation of the instrumentation logic 350 of VMM 0 to determine whether the process is suspicious or even an exploit and, if so, an appropriate course of action. Depending on the seriousness of the violation, VMM 0 may decide to, e.g., change a register value, issue a capability change or spawn a micro-VM (micro-VM 1). VMM 0 may then provide instructions to the microvisor (PD 0) as to a course of action.

Illustratively, the instrumentation logic 350 of VMM 0 may include monitoring logic configured to monitor and collect capability violations in response to one or more interception points to thereby infer an exploit. Inference of an exploit may also be realized through sequences of interception points wherein, for example, a system call followed by another system call having certain parameters may lead to an inference that the process sending the calls is an exploit. The interception point thus provides an opportunity for VMM 0 to perform "light-weight" analysis to evaluate a state of the process in order to detect a possible exploit without requiring any policy enforcement. That is, policy enforcement is not necessary to detect the process as an exploit. VMM 0 may then decide to spawn a micro-VM and configure the capabilities of its protection domain to enable deeper monitoring and analysis (e.g., through interception points and capability violations) in order to determine whether the process is an exploit. Notably, the analysis may also classify the process as a type of exploit (e.g., a stack overflow) and may even identify the exploit. As a result, the invocation of instrumentation and monitoring logic of VMM 0 and its spawned VMs in response to interception points originated by operating system processes and capability violations generated by the microvisor advantageously enhance the virtualization system described herein to provide an exploit detection system configured for real-time security analysis of the operating system processes executing on the node.

VMM 0 may also log the state of the monitored process within system logger 570. In an embodiment, the state of the process may be realized through the contents of the execution context 330 (e.g., CPU registers, stack, program counter, and/or allocation of memory) executing at the time of each capability violation. In addition, the state of the process may be realized through correlation of various activities or behavior of the monitored process. The logged state of the process may thereafter be exported from the system logger 570 to another node 200 of the network environment 100 by, e.g., forwarding the state as one or more IPC messages through VMM 0 (VM 0) and OS specific VMM extension 520 and onto a network protocol stack of the operating system kernel. The network protocol stack may then format the messages as one or more packets for transmission over the network 120, 130.

Figure 6:
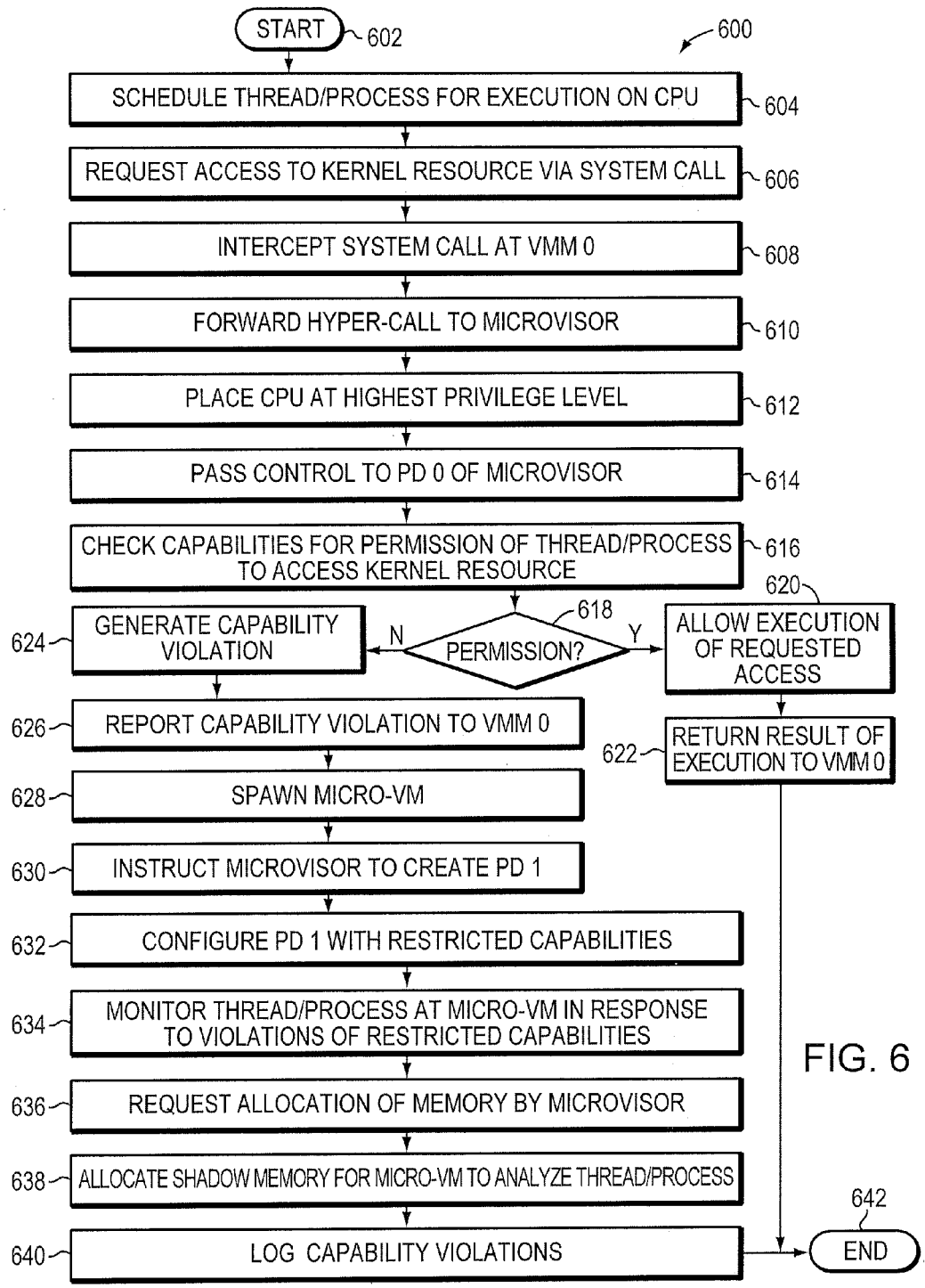
FIG. 6 is an example procedure for implementing the threat-aware microvisor in an exploit detection system to control and analyze access requests to the kernel resources of the system.

FIG. 6 is an example procedure for implementing the threat-aware microvisor in the exploit detection system to control and analyze access requests to the kernel resources of the system. The procedure 600 starts at step 602 and proceeds to step 604 where a thread of a user mode process 240b running within the user space 502 of the micro-virtualization architecture 500 of the exploit detection system may be scheduled for execution on a CPU 212. Illustratively, the thread may execute under a low CPU privilege level. At step 606, the thread may request access to a kernel resource (e.g., a page of memory), where execution of such a request illustratively requires a higher CPU privilege level accorded to the operating system kernel 230. Accordingly, the thread may send a system call 510 to the operating system kernel 230 thereby providing an interception point at which access to the resource is requested. At step 608, VMM 0 may cooperate with OS specific VMM extension 520 to intercept the system call 510. For example, VMM 0 may instruct the OS specific VMM extension 520 to configure the system call table 260 to send a notification to VMM 0 (via VM 0) each time the system call 510 is sent by the thread of process 240b.

At step 610, VMM 0 may generate a hyper-call (in response to the system call notification) that is forwarded over interface 310a to protection domain PD0 of the microvisor 300 which, as noted, illustratively executes at the highest CPU privilege level. At step 612, the microvisor executes the hyper-call (e.g., via an interrupt) to place the CPU 212 into the highest privilege level and, at step 614, passes control to PD 0 (i.e., the execution context 320a associated with the thread) to determine whether the thread may be granted access to the resource. At step 616, the CPU 212 may check the permission (via the capabilities 340a) of the process/thread (via its execution context 320a) to access the requested resource. If it has the appropriate permission (step 618), the requested access of the thread is allowed to execute at step 620 and the result of the execution may be returned to VMM 0 in step 622. Illustratively, instrumentation logic 350 of VMM 0 may determine whether further analysis of the result is warranted or whether the result can be returned to the operating system kernel 230. The procedure then ends at step 642.

However, if the thread does not have the appropriate permission to access the resource at step 618 (i.e., the request violates a capability 340a of PD 0), an exception occurs and a capability violation (trap) is generated that is serviced by the exception handler 530 of the microvisor 300 at step 624. The capability violation may then be reported to VMM 0 (e.g., over interface 310a) at step 626 along with, illustratively, an inquiry as to whether the requested access to the resource should proceed. For example, assume the thread requests access to a page of the memory. The capabilities 340a associated with protection domain PD 0 may be configured to, e.g., deny read or write access to that memory page. Accordingly, each time the thread attempts to read or write that memory page, a capability violation (e.g., an exception) is generated by hardware that is serviced (e.g., caught) by the exception handler 530 and pushed to VMM 0. VMM 0 may then determine whether or not to allow PD0 to execute the requested access to the resource.

In an embodiment, VMM 0 may determine that the requested access is suspicious and, at step 628, decide to spawn a micro-VM (micro-VM 1) to further analyze the access requested by the thread. VMM 0 may then issue a hyper-call (over interface 310a) to the microvisor, instructing the microvisor to create PD 1 by, e.g., cloning PD 0 (step 630). At step 632, VMM 0 may also instruct the microvisor to configure PD 1 with capabilities 340b that are more restricted than PD 0 with respect to access to the kernel resources. At step 634, micro-VM 1 may monitor the process/thread in response to violations of the restricted capabilities. That is, the more restricted capabilities 340b may be configured to generate more capability violations than those generated by the capabilities 340a of PD 0 and, in turn, enable further monitoring of the thread (process 240b) as it attempts to access kernel resources of the node. For instance, the different, restricted capabilities 340b of PD 1 may generate more capability violations (allowing for greater monitoring of behavior) and, thus, push more reports to micro-VM 1 in response to attempted accesses to different pages of memory or to different types of devices (i.e., kernel resources). The micro-VM 1 may then monitor the attempted accesses and their results to determine, e.g., whether the process is an exploit attempting to inject malware into the node.

To that end, the instrumentation logic 360 of micro-VM 1 may decide to trace (e.g., monitor) the thread (e.g., of user mode process 240b) and shadow the requested resource (i.e., the memory page). In an embodiment, micro-VM 1 may request shadowing (e.g., using copy-on-write) of the resource in order to perform further analysis and, in that context, shadowing is dependent on the instrumentation logic 360. Assume further that the instrumentation logic 360B of the micro-VM 1 decides to trace user mode process 240b and, in particular, trace its write access to the memory page. Once the process 240b (e.g., its thread) attempts to access that page, micro-VM 1 may request allocation of a shadow memory page. Alternatively, if different instrumentation of micro-VM 1 decides to trace accesses by the process to, e.g., a registry of the operating system, which is typically a file, micro-VM 1 may request shadowing of those accesses to a file system of the node. Notably, shadowing of accesses by the thread/process may also be logged (e.g., to system logger 570) for further analysis.

Accordingly, the micro-VM 1 may issue a hyper-call over interface 315b, 310b to the microvisor requesting allocation of memory to be used as shadow memory for the page at step 636. In response, the microvisor may allocate a shadow page of memory for use by the micro-VM 1 to analyze the process/thread and its write access at step 638. When the thread of the traced process 240b sends a system call to access the memory page, micro-VM 1 may request that PD 1 resolve an original virtual address of that page to the different, allocated shadow page. Thereafter, every subsequent write access by the traced process 240b may be analyzed via a copy-on-write operation that directs the write access to that shadow page. Assume also that user mode process 240a attempts to access the memory page at the original virtual address. Here, the memory access is directed to the memory page via PD 0, which may execute the request in an efficient manner so as to maintain a timely experience of a user (of the user mode process 240a). In contrast, when the traced process 240b attempts to access the memory page at the virtual address, the memory access is directed through PD1 to the shadow page to enable deeper (and potentially more time-consuming) analysis.

Illustratively, the microvisor associates the kernel resource that the traced (e.g., monitored) process attempts to access to the actual resource that the protection domain (PD 1)

accesses, e.g., the shadow memory page. In essence, the microvisor implements shadowing, but the shadowing is initiated and configured by micro-VM 1. At step 640, the instrumentation logic 360B of micro-VM 1 may cooperate with instrumentation logic 350 of VMM 0 to log capability violations of thread's (process's) accesses to the kernel resource in system logger 570 (as well as other events, such as other access requests, that may be used for correlation), while shadowing (observing) the results of the accesses. Such logging and shadowing enables the microvisor 300 to observe any and all potential attacking behavior (threats) exhibited by the process (exploit). The logging of violations and threats may be collected and maintained as intelligence (i.e., threat intelligence) for further analysis and use by the microvisor and micro-VM 1. The procedure then ends at step 642.

While there have been shown and described illustrative embodiments for deploying the threat-aware microvisor in an exploit detection system of a node to control and analyze access requests (associated with interception points) to kernel resources of the node, it is to be understood that various other adaptations and modifications may be made within the spirit and scope of the embodiments herein. For example, embodiments have been shown and described herein with relation to disposing the microvisor directly over native hardware of the node to enable the microvisor to execute at the highest CPU privilege level so as to virtualize the hardware and control access to the kernel resources of the node. However, the embodiments in their broader sense are not so limited, and may, in fact, allow disposing of the microvisor over a virtual machine which provides a virtualization layer overlaying the hardware. That is, the microvisor may alternatively execute on (i.e., be disposed over) a hypervisor, such as ESXi from VMware, Inc. of Palo Alto, Calif., which may virtualize and control privileges to the native hardware. For this alternative embodiment, the microvisor may execute at a higher CPU privilege level than the software modules overlaying it, yet at a lower CPU privilege level than the underlying virtualization layer.

Advantageously, the threat-aware microvisor described herein may be implemented in any node of a network environment to provide an enhanced virtualization system (e.g., an exploit detection system) configured to detect anomalous behavior indicative of exploits in real-time operation of the node. In addition, the microvisor may be implemented in a resource and operationally efficient (i.e., light-weight) manner that maintains user experience at the node.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system comprising:
   a central processing unit (CPU) adapted to execute a process, a single instance of an operating system kernel, a virtual machine monitor (VMM) and a microvisor;
   a memory configured to store the process, the operating system kernel, the VMM and the microvisor as a micro-virtualization architecture that organizes the memory as a user space and a kernel space, wherein the process, the operating system kernel and the VMM execute in the user space of the architecture, and wherein the microvisor executes in the kernel space of the architecture;
   the microvisor disposed beneath the operating system kernel and configured to communicate with the VMM over a privileged interface, the microvisor further configured to execute at a highest privilege level of the CPU to control access permissions to a plurality of kernel resources accessible by the process; and
   the VMM configured to execute at a highest privilege level of the microvisor to perform a one-to-one mapping between the plurality of kernel resources and the operating system kernel and to expose the mapped kernel resources to the operating system kernel, the operating system kernel configured to execute at a privilege level lower than the highest privilege level of the microvisor, the VMM configured to instantiate a virtual machine containing the operating system kernel, the VMM further configured to instantiate a micro-virtual machine restricted to containing the process, wherein access to the mapped kernel resources is controlled by the VMM among the virtual machine and the micro-virtual machine.

2. The system of claim 1 wherein the operating system kernel comprises an operating system (OS) specific VMM extension adapted to communicate with the VMM, the OS specific VMM extension configured to provide an interface to the VMM that allows introspection of contents of internal structures of the operating system kernel.

3. The system of claim 2 wherein introspection of the contents of the internal structures comprises examination of data structures of the operating system kernel without duplicating the structures.

4. The system of claim 2 wherein the OS specific VMM extension communicates with the VMM over an application programming interface.

5. The system of claim 2 wherein the microvisor comprises one or more protection domains, each protection domain including one or more execution contexts, each execution context tightly linked to a scheduling context and configured to interact with capabilities having contents that specify access control permissions to the kernel resources by the process.

6. The system of claim 5 wherein the scheduling context includes information defining a priority for execution of the execution context on the CPU and wherein the microvisor further comprises a global scheduler configured to cooperate with the scheduling context to schedule the execution context for execution on the CPU.

7. The system of claim 6 wherein the defined priority is implemented by one or more queues and wherein the global scheduler examines the queues to dispatch the scheduling context to the CPU for execution of its linked execution context.

8. The system of claim 5 wherein the microvisor further comprises an exception handler configured to service a trap generated by the CPU in response to a capability violation of an access control permission to a kernel resource.

9. The system of claim 8 wherein the trap comprises one of a page fault and a general protection fault.

10. The system of claim 8 wherein the exception handler is further configured to report the capability violation to the VMM.

11. The system of claim 10 wherein the VMM comprises instrumentation logic that is invoked in response to the capability violation to determine whether the process is suspicious.

12. The system of claim 11 wherein, in response to determining that that process is suspicious, the VMM is configured to instantiate the micro-virtual machine for further analysis of the process.

13. A method comprising:
storing a process, a single instance of an operating system kernel, a virtual machine monitor (VMM) and a microvisor in a memory coupled to a central processing unit (CPU) of a node in a computer network;
organizing the memory as a user space and a kernel space of a micro-virtualization architecture;
executing the microvisor in the kernel space of the architecture and at a highest privilege level of the CPU to control access permissions to a plurality of kernel resources accessible by the process;
executing the VMM in the user space of the architecture and at a highest privilege level of the microvisor to perform a one-to-one mapping between the plurality of kernel resources and the operating system kernel and to expose the mapped kernel resources to the operating system kernel;
executing the operating system kernel in the user space of the architecture and at a privilege level lower than the highest privilege level of the microvisor;
instantiating a virtual machine containing the operating system kernel;
instantiating a micro-virtual machine restricted to containing the process; and
controlling access to the mapped kernel resources among the virtual machine and the micro-virtual machine.

14. The method of claim 13 further comprising:
organizing the microvisor to include a first protection domain bound to the VMM, the first protection domain having one or more execution contexts, each execution context tightly linked to a scheduling context and configured to interact with capabilities having contents that specify access control permissions to the kernel resources by the process.

15. The method of claim 14 further comprising:
switching privilege levels in response to an interception point, wherein the interception point includes one of a memory access request, a function call and a system call.

16. The method of claim 15 wherein instantiating the virtual machine further comprises:
instantiating first instrumentation logic of the virtual machine directed to determination of an exploit in the process.

17. The method of claim 16 wherein executing the VMM further comprises:
executing second instrumentation logic of the VMM to analyze the interception point originated by the process to invoke services of the operating system kernel.

18. The method of claim 17 wherein executing the VMM further comprises:
in response to the interception point, assuming control over the operating system kernel at the VMM to enable monitoring of activity of the process.

19. The method of claim 18 wherein executing the VMM further comprises:
enabling communication between the operating system kernel and microvisor over a privileged interface embodied as a set of hyper-calls.

20. A system comprising:
a central processing unit (CPU) adapted to execute a plurality of user mode processes, a single instance of an operating system kernel, a type 0 virtual machine monitor (VMM 0) and a microvisor;
a memory configured to store the user mode processes, the operating system kernel, the VMM 0 and the microvisor as a micro-virtualization architecture that organizes the memory as a user space and a kernel space, wherein the user mode processes, the operating system kernel and the VMM 0 execute in the user space of the architecture, and wherein the microvisor executes in the kernel space of the architecture;
the microvisor disposed beneath the operating system kernel and configured to communicate with the VMM 0 over a privileged interface, the microvisor further configured to execute at a highest privilege level of the CPU to control access permissions to a plurality of kernel resources accessible by the user mode processes;
the VMM 0 including instrumentation logic configured to analyze a system call issued by a first process to invoke services of the operating system kernel that include accesses to the kernel resources, the VMM 0 configured to execute at a highest privilege level of the to perform a one-to-one mapping between the plurality of kernel resources and the operating system kernel and to expose the mapped kernel resources to the operating system kernel, the VMM 0 configured to instantiate a virtual machine containing the operating system kernel, the VMM 0 further configured to instantiate a plurality of micro-virtual machines, each micro-virtual machine restricted to containing one of the processes, wherein access to the mapped kernel resources is controlled among the virtual machine and the micro-virtual machines by the VMM 0; and
the operating system kernel including an operating system specific VMM 0 extension adapted to communicate with the VMM 0, the operating system kernel configured to execute at a privilege level lower than the highest privilege level of the microvisor.

21. A non-transitory computer readable media containing instructions for execution on a processor for a method comprising:
storing a plurality of processes, a single instance of an operating system kernel, a virtual machine monitor (VMM) and a microvisor in a memory coupled to a central processing unit (CPU) of a node in a computer network;
organizing the memory as a user space and a kernel space of a micro-virtualization architecture;
executing the microvisor in the kernel space of the architecture and at a highest privilege level of the CPU to control access permissions to a plurality of kernel resources accessible by the processes;
executing the VMM in the user space of the architecture and at a highest privilege level of the microvisor to perform a one-to-one mapping between the plurality of kernel resources and the operating system kernel and to expose the mapped kernel resources to the operating system kernel;
executing the operating system kernel in the user space of the architecture and at a privilege level lower than the highest privilege level of the microvisor;
instantiating a virtual machine containing the operating system kernel;

instantiating a plurality of micro-virtual machines, each micro-virtual machine restricted to containing one of the processes; and controlling access to the kernel resources among the virtual machine and the micro-virtual machine.

\* \* \* \* \*

UNITED STATES PATENT AND TRADEMARK OFFICE
CERTIFICATE OF CORRECTION

PATENT NO. : 9,292,686 B2  
APPLICATION NO. : 14/229626  
DATED : March 22, 2016  
INVENTOR(S) : Osman Abdoul Ismael et al.

Page 1 of 1

It is certified that error appears in the above-identified patent and that said Letters Patent is hereby corrected as shown below:

In the Specification:

Col. 11, line 26 should read:  
create (clone) a protection domain, but the capabilities 340$b$ of In the Claims:

Claim 20, Col. 18, line 25 should read:  
to execute at a highest privilege level of the microvisor to perform a Signed and Sealed this  
Fifth Day of July, 2016

Michelle K. Lee  
*Director of the United States Patent and Trademark Office*